US009464264B2

(12) United States Patent
Jalbert et al.

(10) Patent No.: US 9,464,264 B2
(45) Date of Patent: Oct. 11, 2016

(54) METHOD AND APPARATUS FOR MAKING A LAUNDRY DETERGENT SHEET

(71) Applicant: Dizolve Group Corp., Moncton (CA)

(72) Inventors: Luc Jalbert, Shediac Bridge (CA); Leo Miller, Moncton (CA); Marc Surette, Moncton (CA); Irina Bogdanova, Memramcook (CA)

(73) Assignee: Dizolve Group Corp., New Brunswick (CA)

(*) Notice: Subject to any disclaimer, the term of this patent is extended or adjusted under 35 U.S.C. 154(b) by 68 days.

(21) Appl. No.: 14/243,489

(22) Filed: Apr. 2, 2014

(65) Prior Publication Data
US 2015/0218497 A1 Aug. 6, 2015

(30) Foreign Application Priority Data

Feb. 6, 2014 (CA) ..................................... 2842442

(51) Int. Cl.
C11D 11/00 (2006.01)

(52) U.S. Cl.
CPC .................... C11D 11/00 (2013.01)

(58) Field of Classification Search
None
See application file for complete search history.

(56) References Cited

U.S. PATENT DOCUMENTS

| | | | |
|---|---|---|---|
| 2,112,963 A | 4/1938 | Jones | |
| 2,665,528 A | 1/1954 | Sternfield et al. | |
| 3,694,364 A | 9/1972 | Edwards | |
| 3,904,543 A | 9/1975 | Knighten | |
| 3,950,277 A | 4/1976 | Stewart et al. | |
| 4,853,142 A | 8/1989 | Win et al. | |
| 4,938,888 A | 7/1990 | Kiefer et al. | |
| 5,574,179 A | 11/1996 | Wahl et al. | |
| 5,863,887 A * | 1/1999 | Gillette | C11D 1/62 510/496 |
| 6,818,606 B1 | 11/2004 | Hanada et al. | |
| 6,864,196 B2 | 3/2005 | Graham et al. | |
| 6,949,498 B2 | 9/2005 | Murphy et al. | |
| 7,094,744 B1 | 8/2006 | Kobayashi et al. | |
| 7,544,409 B2 * | 6/2009 | Copland | A45D 37/00 424/414 |
| 2004/0046272 A1 * | 3/2004 | Arai | B29C 41/26 264/28 |
| 2005/0037942 A1 * | 2/2005 | Otterson | C11D 1/06 510/499 |
| 2008/0014393 A1 | 1/2008 | Denome et al. | |
| 2008/0064618 A1 | 3/2008 | Bastigkeit et al. | |
| 2009/0291282 A1 | 11/2009 | Kitamura et al. | |
| 2011/0028374 A1 * | 2/2011 | Fossum | C11D 3/0052 510/296 |
| 2011/0136719 A1 | 6/2011 | Jalbert et al. | |
| 2012/0207699 A1 * | 8/2012 | McHatton | A61L 9/013 424/76.8 |

FOREIGN PATENT DOCUMENTS

| | | |
|---|---|---|
| CA | 2695068 | 9/2010 |
| CN | 101063066 | * 11/2011 |
| CN | 102492573 | * 4/2013 |
| EP | 2226379 | 8/2010 |
| KR | 20130124261 | 11/2013 |
| WO | WO2004087857 | 10/2004 |
| WO | WO2006134657 | 12/2006 |
| WO | WO2007034471 | 3/2007 |

* cited by examiner

Primary Examiner — Lorna Douyon
(74) Attorney, Agent, or Firm — Boyle Fredrickson, S.C.

(57) ABSTRACT

A method and apparatus for making a laundry detergent sheet. Preferably, the laundry detergent sheet is capable of dissolving in a laundry cycle of an automatic washing machine. The method comprises the steps of preparing a first shelf-stable solution, preparing a second non-shelf-stable solution comprising a portion of the first shelf-stable solution, applying the second non-shelf-stable solution onto a surface, and drying the second non-shelf-stable solution on the surface.

50 Claims, 10 Drawing Sheets

METHOD AND APPARATUS FOR MAKING A LAUNDRY DETERGENT SHEET

FIELD OF THE INVENTION

The present invention relates to the field of laundry and more particularly to laundry detergent. Most specifically, this invention relates to a method and apparatus for making a laundry detergent product as well as the product itself, which can take the form of a laundry detergent sheet.

BACKGROUND OF THE INVENTION

Liquid and powder laundry detergent products for laundering of fabrics are known. A problem with these known forms of laundry detergent products is that consumers are required to measure out appropriate amounts of the detergent from containers, which often leads to consumers using too much, or too little detergent. Furthermore, the process of measuring out the liquid or powder detergents is inconvenient, and messy, often leading to accidental spills. Additionally, conventional powder and liquid laundry detergents are bulky and to deliver enough washing loads in a single package can require large and awkward containers which increases the costs of shipping and storing the products through the supply chain. As well these large containers can be hard for consumers to handle store and use.

Attempts to overcome the problems associated with the liquid and powder detergent products have led to the development of products containing pre-measured amounts of detergent in single use dosage forms, such as dissolvable laundry pouches containing, for example, liquid detergent (and often other cleaning aids), and laundry detergent sheets.

Dissolvable laundry detergent pouches filled with powdered and/or liquid laundry detergents are well known. These types of laundry detergent pouches have some perceived disadvantages however. First, the transfer of the detergent through the laundry pouch walls is not always sufficiently fast to deliver a full cleaning dose in the appropriate part of the laundry cycle. Second there are limits to the amount of laundry detergent that can be contained in a single pouch. Third, laundry detergent pouches are not configured to be split into smaller portions for use with smaller laundry loads. Fourth, laundry detergent pouches are generally bulky and large which increases their shipping and storing costs.

In contrast to laundry detergent pouches, impregnated laundry detergent sheets have a relatively small footprint, resulting in substantially lower shipping and storage costs throughout the supply chain. Their small physical dimensions also makes impregnated laundry detergent sheets eco-friendly since far less carbon is generated from fossil fuel energy spent in transporting them from their place of manufacture to the ultimate consumer, as compared to their bulkier liquid, powder, and pouch counterparts.

Known examples of impregnated laundry detergent sheets feature a substrate with a plurality of uniformly distributed perforations, into which is disposed a detergent composition. Passage of water through the perforations during the laundry cycle in a washing machine then aids in the release of the detergent to the substrate surface and into the wash water. In U.S. Pat. No. 4,853,142, a plastic web forms the substrate which supports the detergent in a sheet-like format. Similarly, U.S. Pat. No. 4,938,888 discloses a detergent combination impregnated into a flexible substrate composed of foam, foil, paper, and woven or non-woven cloth of various materials. A problem with these types of impregnated laundry detergent sheets is that the substrate does not dissolve in the wash water and remains in the washing machine after completion of the laundry cycle. These non-dissolvable substrates also tend to cling to certain areas of the clothing being washed, making it more difficult for the embedded detergent to release from the substrate completely.

U.S. Pat. Nos. 6,818,606 and 7,094,744, disclose attempts to overcome the above problems associated with laundry detergent sheets by using dissolvable substrates. The '606 patent discloses a sheet of laundry detergent comprising a layer containing a detergent composition and a water-soluble substrate provided on both sides of the layer, wherein the layer comprises a water-soluble or disintegrating-in-water particle group, having an average particle diameter of 60 to 2000 μm, consisting of a particle group. The '744 patent discloses a method for producing a sheet type laundry detergent in which a thin layer of a doughy detergent composition can be formed with uniform thickness and width while retaining high solubility and detergency on use. According to the disclosed method a doughy detergent composition is continuously or discontinuously applied onto a water-soluble or water-dispersable flexible support of continuous length that is running continuously in a prescribed direction to form a thin layer on the doughy detergent composition.

The use of a water-soluble or water-dispersable support eliminates the problems associated with an imperfect release from the substrate (i.e. a sheet of plastic or cloth), as well as problems of the substrate remaining with the clothes in the automatic washing machine at the end of the laundry cycle. However, the methods of making the laundry detergent sheets described in the '606 and '744 patents are complex. For example, the '606 patent teaches forming the substrate and detergent layers separately first. The detergent layer material is then sandwiched between two sheets of laminated water-soluble substrates and then heat sealed around the edges. The '744 patent similarly requires the water-soluble or dispersable flexible support to be formed first, then in a separate step, the doughy detergent composition is applied onto the water-soluble or dispersable flexible support.

Other prior art patent publications of general interest in the field of laundry detergent sheets include:
U.S. Pat. No. 2,112,963;
U.S. Pat. No. 2,665,528;
U.S. Pat. No. 3,694,364;
U.S. Pat. No. 3,904,543;
U.S. Pat. No. 3,950,277;
U.S. Pat. No. 5,574,179;
U.S. Pat. No. 6,864,196
U.S. Pat. No. 6,949,498;
Pat. App. Pub. No. 2008/0014393;
U.S. Pat. App. Pub. No. 2008/0064618;
U.S. Pat. App. Pub. No. 2009/0291282;
U.S. Pat. App. Pub. No. 2011/0136719;
PCT Int'l Pat. App. Pub. No. WO 2004/087857;
PCT Int'l Pat. App. Pub. No. WO 2006/134657;
PCT Int'l Pat. App. Pub. No. WO 2007/034471;
CA Pat. App. No. 2,695,068; and
EPO Pat. App. Pub. No. 2,226,379.

SUMMARY OF THE INVENTION

What is desired is an improved method for making laundry detergent sheets, which is simpler, and more cost effective than prior art methods. Preferably the laundry detergent sheets formed according to this improved method are easy to handle and store when dry, yet quickly and completely dissolve in the laundry cycle of an automatic washing machine without leaving a residue.

According to preferred embodiments of the present invention, the ingredients used to make the laundry detergent sheets are mixed in two separate batches. A first shelf-stable solution can be made in one large batch because it is storable for a relatively long period of time (i.e. 2 months or longer) after the ingredients are thoroughly mixed together. A second non-shelf-stable solution, which includes a portion of the first shelf-stable solution, can be made in a smaller batch for immediate use. The second non-shelf-stable solution is usable only for a relatively short period of time (i.e. 6 hours or less) after the ingredients are thoroughly mixed together, because it tends to deteriorate. It is believed that this short time span is due to fermentation of starch contained in the second non-shelf-stable solution. Preferably, the second non-shelf-stable solution is applied to a heated surface to dry, thereby forming the laundry detergent sheet. Provided this drying step is undertaken in a timely way the deterioration problem identified above is avoided.

According to a preferred embodiment of the present invention, a heated cylinder is provided having a horizontal axis of rotation. In use, a rising portion of an outer surface of the heated cylinder is brought into contact with the second non-shelf-stable solution as the heated cylinder is being rotated, to coat the outer surface with the second non-shelf-stable solution. The cylinder is sized and shaped to allow excess second non-shelf-stable solution to drain off the rising portion of the outer surface in a direction opposite to the direction of rotation. Preferably, an application reservoir for holding a liquid volume of the second non-shelf-stable solution is positioned against the rising portion of the outer surface. The liquid level of the second non-shelf-stable solution in the application reservoir is preferably maintained to ensure an even film is drawn up onto the rising outer surface. A preferred way to maintain the appropriate liquid level of the liquid volume of the second non-shelf-stable solution in the application reservoir is to use a gravity feed from a supply reservoir.

Therefore, according to one aspect of the present invention, there is disclosed a method of making a laundry detergent sheet, said method comprising the steps of:
preparing a first shelf-stable solution;
preparing a second non-shelf-stable solution comprising a portion of said first shelf-stable solution;
applying said second non-shelf-stable solution onto a surface; and
drying said second non-shelf-stable solution on said surface to form said laundry detergent sheet.

According to another aspect of the present invention, there is disclosed a method of making a laundry detergent sheet, said method comprising the steps of:
preparing a first shelf-stable solution;
preparing a second non-shelf-stable solution comprising a portion of said first shelf-stable solution;
contacting a rising portion of a surface on one side of a heated cylinder, rotating in one direction about a horizontal axis, with said second non-shelf-stable solution to coat said surface with said second non-shelf-stable solution and allow excess second non-shelf-stable solution to drain off said rising portion of said surface in a direction opposite the one direction;
drying said second non-shelf-stable solution on said surface of said heated cylinder to form said laundry detergent sheet; and
removing said laundry detergent sheet from said surface.

According to another aspect of the present invention, there is disclosed an apparatus for making a laundry detergent sheet, said apparatus comprising:
a supply reservoir for holding a solution adapted to dry to form said laundry detergent sheet;
an applicator in fluid communication with said reservoir;
a surface positioned adjacent said applicator to permit said applicator to apply said solution to said surface; and
a means to dry said solution on said surface to form said laundry detergent sheet.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

Figure 1:
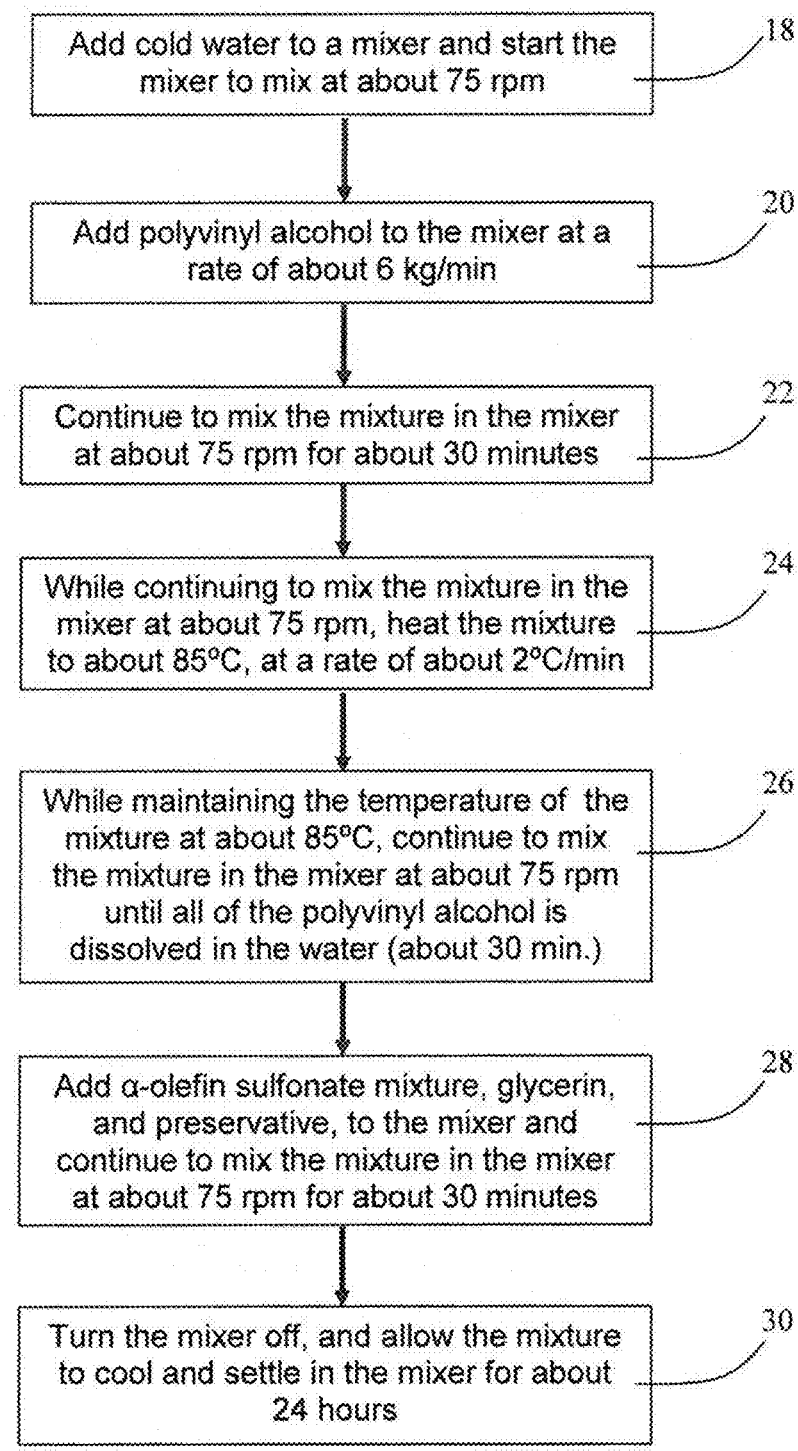
FIG. 1 is a flow chart showing the steps for making a first shelf-stable solution according to an embodiment of the present invention.

The present invention is described in more detail with reference to exemplary embodiments thereof as shown in the appended drawing. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

A laundry detergent sheet 10 can be made according to one embodiment of the present invention, by preparing a first shelf-stable solution 12, then preparing a second non-shelf-stable solution 14 comprising a portion of the first shelf-stable solution 12. The second non-shelf-stable solution 14 is then applied onto a surface 16, and dried to form the laundry detergent sheet 10.

The first shelf-stable solution 12 is preferably prepared in large batches because it is storable for a relatively long period of time (i.e. 2 months or longer) after the ingredients are thoroughly mixed together. The first shelf-stable solution 12 is preferably prepared in large batches for efficiency and economy of scale. The second non-shelf-stable solution 14, which includes a portion of the first shelf-stable solution, is preferably prepared in a smaller batch for immediate use, because it remains usable only for a relatively short period of time (i.e. 6 hours or less) after the ingredients are thoroughly mixed together. In other words, the second non-shelf-stable solution 14 will preferably be applied to the surface 16 for drying within 6 hours after its ingredients are thoroughly mixed together. It is believed that this shortened time span is due to fermentation of starch present in the second non-shelf-stable solution 14.

Preparing the second non-shelf-stable solution in two stages as mentioned above is preferred because the first shelf-stable solution 12 takes a considerable length of time to mix and cool (i.e. greater than about 24 hours), as well as the advantages had with economies of scale used to make the first shelf-stable solution 12 in large batches sufficient to supply production for several weeks. However, it is contemplated that in another embodiment of the present invention, the second non-shelf-stable solution 14 may be prepared without a step of storing the first shelf-stable solution 12. Accordingly, embodiments of the invention in which the second non-shelf-stable solution 14 is prepared in one continuous process are comprehended by the present invention. However, the preferred method of preparing the first shelf-stable solution 12 in one or more large batches which are stored and then preparing the second non-shelf-stable solution 14 for immediate use using a portion of the previously prepared first shelf-stable solution 12 is described below.

The preferred first shelf-stable solution 12 contains:
  about 5 to about 20 wt %, most preferably about 10.10 wt-%, of polyvinyl alcohol;
  about 15 to about 30 wt-%, most preferably about 21.80 wt-%, of α-olefin sulfonate mixture;
  about 1 to about 15 wt-%, most preferably about 10.66 wt-%, of glycerin,
  about 0.01 to about 5 wt-%, most preferably about 0.14 wt-%, of preservative; and
  about 20 to about 80 wt-%, most preferably about 57.30 wt-%, of water.

A preferred preservative contains about 0.375 wt-% methylisothiazolinone, and 1.125 wt-% chloromethylisothiazolinone (available under the brand name Acticide® SPX, manufactured by Thor GmbH, Germany). What is desirable is to provide a preservative which inhibits growth of microbes and fungi in the first shelf-stable solution 12 to permit its storage for several months until it is used to make the second non-shelf-stable solution 14. It will be appreciated by persons skilled in the art that other preservatives may be used in combination with the Acticide SPX preservative or in place of it. All such other preservatives are comprehended by the present invention.

A preferred α-olefin sulfonate mixture contains:
  about 36 to about 42 wt-%, most preferably about 38 wt-%, of α-olefin sulfonate; and
  about 58 to about 64 wt-%, most preferably about 62 wt-%, of water.

α-olefin sulfonate is an anionic surfactant that aids in cleaning cloth material, and also helps in achieving the target viscosity of the first shelf-stable solution 12.

Examples of ready to use α-olefin sulfonate mixtures include Sulfodet™ XL 48, manufactured by AARTI Industries Limited (Surfactant Specialties Div.), U.T. of Dadra & Nagar Haveli, India (available from Canada Colors and Chemicals, Brampton, Ontario, Canada), and Calsoft® AOS-40, manufactured by Pilot Chemical Company, Cincinnati, Ohio, USA.

Preferably, the first shelf-stable solution 12 may have a density of about 1.01 to 1.20 g/ml at room temperature (i.e. 20° to 24° C.), and a viscosity range of:
  about 45,000 to about 85,000 centipoise, at temperatures of about 14° C. to about 18° C.;
  about 22,000 to about 67,000 centipoise, at temperatures of about 20° C. to about 24° C.; and
  about 12,000 to about 40,000 centipoise, at temperatures of about 28° C. to about 32° C.

It will be appreciated that the viscosity and density of the first shelf-stable solution 12 will govern the viscosity and density of the second non-shelf-stable solution 14. Furthermore, the viscosity and density of the second non-shelf-stable solution 14 controls the thickness of the coating applied to the surface 16, and ultimately the thickness of the laundry detergent sheet 10. If the viscosity of a batch of the first shell-stable solution 12 is too low, polyvinyl alcohol may be added to the mixture in the mixer to increase the viscosity of the first shelf-stable solution 12 to the desired viscosity range. If the viscosity of a batch of the first shelf-stable solution 12 is too high, water may be added to the mixture in the mixer to reduce the viscosity to the desired viscosity range.

FIG. 1 is a flow chart showing steps for mixing the above ingredients to prepare the first shelf-stable solution 12, according to an embodiment of the present invention. For example, in step 18, cold water (i.e. less than 25° C.) is added into a mixer to avoid clumping of the polyvinyl alcohol polymer. Preferably, the mixer may have a capacity of 2500 kg, and be of the type having a closed loop steam heating system, as will be known to a person skilled in the art, such as for example, a Henschel® Model FM 2000-liter heated mixer. The mixer is turned on and set to mix with a rotational speed in the preferred range of about 60 to about 90 rotations per minute (rpm). Most preferably, the mixer is set to mix at a speed of about 75 rpm.

In step 20 polyvinyl alcohol pellets or powder is added to the mixer at a rate in the preferred range of about 5 to about 7 kg/min. Most preferably, the polyvinyl alcohol is added to the mixer at a rate of about 6 kg/min to permit the polyvinyl alcohol to distribute somewhat evenly in the water. It will be appreciated that the addition of the amount of polyvinyl alcohol required for a batch size of for example 2,500 kg of the first shelf-stable solution 12 (i.e. 252.5 kg) at a rate of about 6 kg/min will take at least 42.08 minutes. Of course, larger batch sizes may require more time to add the polyvinyl alcohol, while smaller batch sizes may require less time.

Next, at step 22, the water and polyvinyl alcohol mixture is mixed in the mixer until the polyvinyl alcohol becomes sufficiently swollen. When the polyvinyl alcohol becomes sufficiently swollen, the mixture will have the appearance of cream of wheat or tapioca. Preferably, the water and polyvinyl alcohol mixture is mixed for about 30 minutes, which has been found to be sufficient for the polyvinyl alcohol to become sufficiently swollen.

At step 24, while the mixer continues to mix the mixture, the mixer may be set to begin raising the temperature of the mixture at a rate of about 2° C. Per minute until the mixture reaches a temperature in the preferred range of about 80 to about 90° C. Most preferably, at the end of step 24 the temperature of the mixture will be about 85° C.

At step 26, the mixer maintains the mixture in the preferred range of about 80 to about 90° C., most preferably about 85° C., and continues to mix the mixture until substantially all of the polyvinyl alcohol is dissolved in the water. By way of example only, it has been found that a mixing time of about 30 minutes is often to dissolve substantially all of the polyvinyl alcohol in the water. However, it will be appreciated that a shorter mixing time of for example 20, or fewer, minutes may also yield acceptable results. Furthermore, the mixing time in step 26 can be extended for a longer time (i.e. 30 min.) if necessary to dissolve all of the polyvinyl alcohol in the water. The precise mixing time for step 26 will be easily ascertainable by the person skilled without undue experimentation. What is desirable is that at the end of step 26 substantially all of the polyvinyl alcohol is dissolved in the water.

At step 28, the remaining ingredients of α-olefin sulfonate mixture, glycerin, and preservative are added to the mixer, and the mixer may continue to mix the mixture until it is homogeneous. It has been found that mixing for 30 minutes is sufficient to achieve a homogeneous mixture.

At step 30, the mixture may be allowed to cool and settle in the mixer for about 24 hours, resulting in the first shelf-stable solution 12. Preferably, the viscosity and density of the first shelf-stable solution 12 may be measured at the end of step 30 to confirm that they fall within the ranges mentioned above. As mentioned above, if the viscosity of a batch of the first shelf-stable solution 12 is too low, polyvinyl alcohol may be added to the mixture in the mixer to increase the viscosity of the first shelf-stable solution 12 to the desired viscosity range. If the viscosity of a batch of the first shelf-stable solution 12 is too high, water may be added to the mixture in the mixer to reduce the viscosity to the desired viscosity range.

The first shelf-stable solution 12 may then be pumped out of the mixer into one or more containers. Preferably, the one or more containers are portable containers, which can be stored for several months, until the first shelf-stable solution 12 contained therein, is needed for use in subsequent steps in the making of the laundry detergent sheets which are described next. The length of time the first shelf-stable solution 12 may be stored is largely dependent on the preservative used and its concentration in the mixture. It will be appreciated that the activity of the preservative will gradually decline over time. When the activity of the preservative drops below a certain level, the first shelf-stable solution 12 will begin to deteriorate. Once the first shelf-stable solution 12 deteriorates to a certain level, it will not be suitable for making the laundry detergent sheet 10 according to the present invention. However, it has been found that a first shelf-stable solution 12 prepared according to the present invention may be stored for about 6 to 12 months.

According to a preferred embodiment of the present invention, a portion of the first shelf-stable solution 12 may be used to prepare the second non-shelf-stable solution 14. As mentioned above, the second non-shelf-stable solution 14 is preferably prepared in a smaller batch for immediate use, because it may remain usable only for a relatively short period of time (i.e. 6 hours or less) after the ingredients are thoroughly mixed together.

The preferred second non-shelf-stable solution 14 for making unscented laundry detergent sheets contains:
- about 20 to about 80 wt-%, most preferably 67 wt-%, of the first shelf-stable solution 12;
- about 10 to about 50 wt-%, most preferably 19.7 wt-%, of starch;
- about 0.1 to about 5 wt-%, most preferably 0.5 wt-%, of liquid paraffin (mineral oil);
- about 0.1 to about 5 wt-%, most preferably 1%, of glycerin; and
- about 1 to about 25 wt-%, most preferably 11.8 wt-%, of liquid detergent mixture.

Preferred starches include corn starch, rice starch, tapioca starch, pea starch, potato starch, and various chemically modified starches, such as oxidized starches, and reduced starches. The preferred starch may depend on economical and functional (i.e. rate of drying, texture of laundry detergent sheet 10, granule sizes, etc.) considerations. In this regard, good results have been achieved with corn starch.

The liquid paraffin (mineral oil) allows the laundry detergent sheet 10 to be more easily removed from the surface 16.

As will be appreciated by persons skilled in the art, glycerine and water are commonly used as plasticisers for polyvinyl alcohol, to provide flexibility and elongation of the polymer. However, while water evaporates, glycerine does not. Thus, according to the present invention the addition of glycerine helps to provide a flexible laundry detergent sheet 10 with a more pleasant texture and feel. The amount of glycerine is preferably increased for example to accommodate for various relative humidity conditions at the laundry detergent sheet manufacturing plant if relative humidity is not controlled. As will be appreciated this consideration relates to glycerine-water hysteresis. Further, such an increase in the amount of glycerine will preferably be smaller in a humid season, and larger in a dry season.

The preferred liquid detergent mixture used in the preparation of the second non-shelf-stable solution contains:
- about 5 to about 50 wt-% of water;
- about 5 to about 90 wt-% of sodium laureth sulfate;
- about 0.1 to about 5 wt-% of sodium borate;
- about 0.1 to about 10 wt-% of sodium metasilicate;
- about 0.1 to about 10 wt-% of hexylene glycol;
- about 0.1 to about 10 wt-% of cocamidopropyl betaine;
- about 0.1 to about 10 wt-% of citric acid;
- about 0.1 to about 10 wt-% of lauryl glucoside; and
- about 0.1 to about 20 wt-% of laureth-4.

However, the exact ingredients making up the liquid detergent mixture and their precise ratios are not essential to the present invention. A suitable liquid detergent mixture may be obtained from any one of a number of manufacturers including, for example, Stepan Company (Northfield, Ill., U.S.A.), and Lanxess AG (Leverkusen, Germany). It is important that the liquid detergent mixture is compatible with the other ingredients in the second non-shelf-stable solution 14.

Furthermore, it will be appreciated by persons skilled in the art that it may be desirable to add fragrances, dyes, as well as other chemicals, such as for example, optical brighteners, enzymes, fabric softeners, bleaches, water softening agents, chelates, soil anti-redeposition agents, colour-protecting agents, dye-transfer agents, known in the art, or later discovered, to impart expected characteristics or qualities to the resulting laundry detergent sheets. All such modifications to the second non-shelf-stable solution 14 are comprehended by the present invention.

Figure 2:
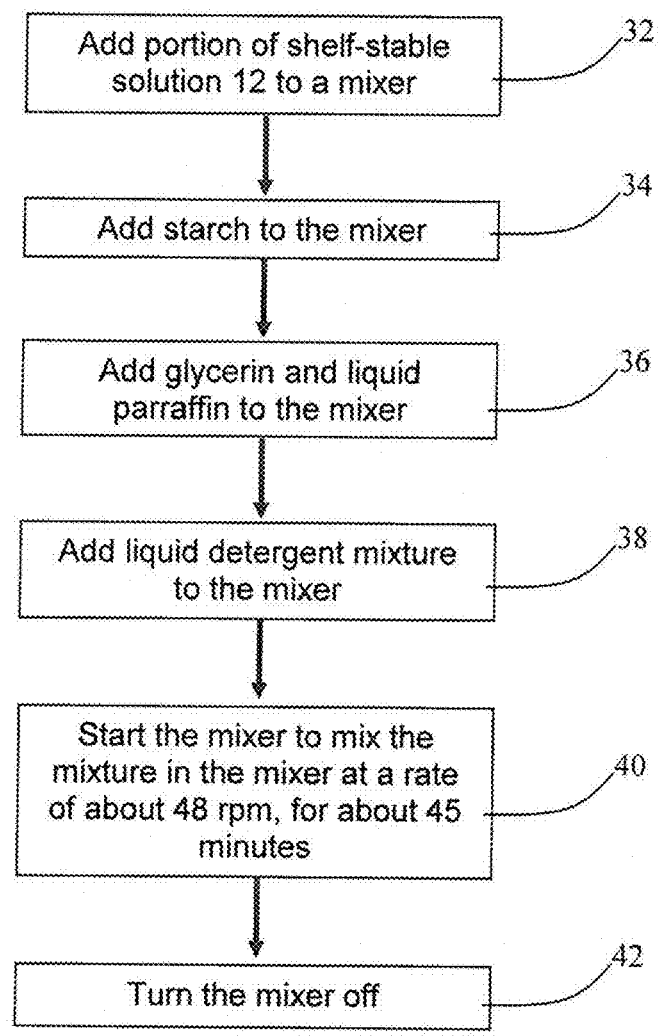
FIG. 2 is a flow chart showing the steps for making a second non-shelf-stable solution according to an embodiment of the present invention.

FIG. 2 is a flow chart showing steps for mixing the above ingredients to prepare the second non-shelf-stable solution 14, according to an embodiment of the present invention. For example, in step 32, a portion of the shelf-stable solution 12 prepared previously, as discussed above, is placed into a mixer. Preferably, the mixer may have a capacity of about 100 kg, and be of the type having a 4-bladed mixing shaft which is commonly used in the field of baking dough and the meat industry system, as will be known to a person skilled in the art. By way of example, good results have been obtained using a Model 44146 commercial meat mixer with a 220 pound capacity manufactured by TSM Products (Buffalo, N.Y., U.S.A.).

Next, at step 34, the starch may be added to the first shelf-stable solution 12 in the mixer.

At step 36, the liquid paraffin (mineral oil) and glycerin may be added to the mixture in the mixer.

At step 38, the liquid detergent mixture may be added to the mixture in the mixer.

At step 40, the mixer is set to mix with a rotational speed in the preferred range of about 40 to about 56 rpm, most preferably 48 rpm, and turned on for about 45 minutes, resulting in the second non-shelf-stable solution 14.

As mentioned above, preferably within about 6 hours after the second non-shelf stable solution 14 is prepared it may be used to make laundry detergent sheets according to the present invention. Accordingly, shortly after the end of step 40, the second non-shelf-stable solution 14 is preferably transferred to a supply reservoir 48 of the laundry detergent sheet making apparatus 46.

Although the first shelf-stable solution 12 may be stored as discussed above, the person skilled in the art will appreciate that the first shelf-stable solution 12 need not be stored before it is used in the preparation of the second non-shelf-stable solution 14. In other words, the present invention contemplates using the first shelf-stable solution 12, immediately after it is made in step 30, to prepare the second non-shelf-stable solution 14.

As mentioned above, preparing the second non-shelf-stable solution 14 in two stages is preferred because the first shelf-stable solution 12 takes a considerable length of time to mix and cool, as well as the advantages had with economies of scale used to make the first shelf-stable solution 12 in large batches sufficient to supply production for several weeks. However, it is contemplated that in another embodiment of the present invention, the second non-shelf-stable solution 14 may be prepared without a step of storing the first shelf-stable solution 12. For example, the person skilled in the art will now appreciate that steps 18 to 42 in FIGS. 1 and 2 can be combined, without undue experimentation, to prepare the second non-shelf-stable solution 14 in one stage, in one or more mixers, as may be desired. However, as previously mentioned, the preferred method of preparing the second non-shelf-stable solution 14 involves two stages as described above.

Figure 3:
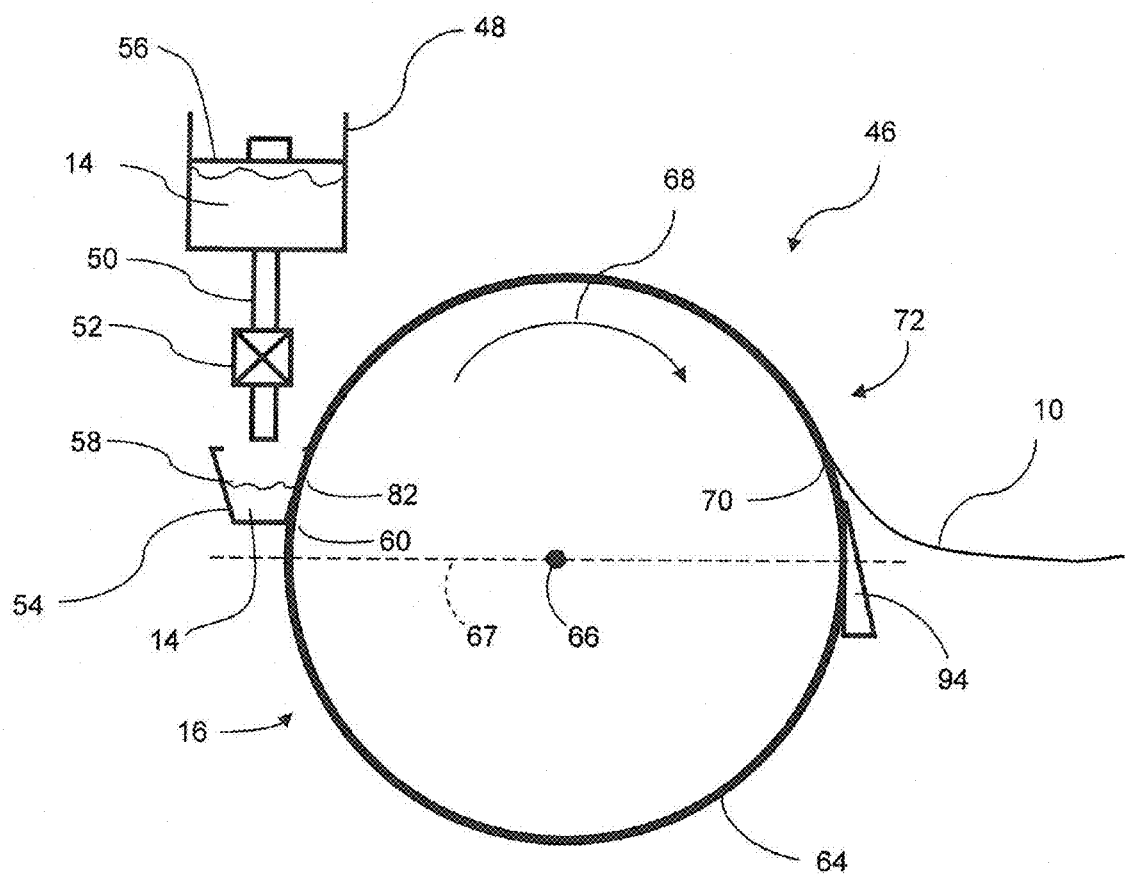
FIG. 3 is a diagram showing an apparatus for making the second non-shelf-stable solution into a laundry detergent sheet according to an embodiment of the present invention.

From the above description, the person skilled in the art will understand how to prepare the second non-shelf-stable solution 14, according to an embodiment of the present invention. The following therefore describes how the second non-shelf-stable solution 14 may be applied to a surface and dried into a laundry detergent sheet using the laundry detergent sheet making apparatus 46, according to an embodiment of the present invention. A preferred embodiment of the laundry detergent sheet making apparatus 46 is shown in FIG. 3. As shown, the preferred apparatus 46 includes a supply reservoir 48 configured for receiving and holding the second non-shelf-stable solution 14. A conduit 50 connected to a lower portion of the supply reservoir 48 may be positioned to feed the second non-shelf-stable solution 14 from the supply reservoir 48 into an application reservoir 54. The flow of the second non-shelf-stable solution 14 from the supply reservoir 48 through the conduit 50 to the application reservoir 54 is preferably controlled by a valve 52. Preferably, the flow of the second non-shelf-stable solution 14 from the supply reservoir 48 to the application reservoir 54 is under gravity alone without any mechanical assistance. It is believed that the application of pressure to the second non-shelf-stable solution 14 may result in large air bubbles forming in the laundry detergent sheets, which is not desirable. Additionally, the supply reservoir 48 is preferably configured to minimize exposure of the second non-shelf-stable solution 14 held therein to air. For example, the supply reservoir 48 may be provided with a floating lid 56 that rests on top of the second non-shelf-stable solution 14, and descends into the supply reservoir 48 as the second non-shelf-stable solution 14 feeds into the application reservoir 54.

Valve 52 is preferably used to regulate a liquid level 58 of the second non-shelf-stable solution 14 in the application reservoir 54. For example, a minimum and maximum liquid volume of the second non-shelf-stable solution 14 may be maintained in the application reservoir 54 to provide a liquid level 58 of the second non-shelf-stable solution 14 in the application reservoir 54 in a preferred range of about 1 to about 2 inches. It has been found that maintaining less than about 1 inch of second non-shelf-stable solution 14 in the application reservoir 54 may cause voids to occur in the resulting laundry detergent sheet 10 because the viscous second non-shelf-stable solution 14 does not flow quickly enough at such a shallow liquid level to replace the second non-shelf-stable solution 14 that is removed by the outer surface 16 of the rotatable cylinder 64. On the other hand, maintaining the second non-shelf-stable solution 14 at a liquid level of about 2 inches is a function of the application reservoir 54 capacity, and a desire to limit the amount of second non-shelf-stable solution 14 that is exposed to the surrounding air and heat. In particular, it is desirable to ensure that the second non-shelf-stable solution 14 does not stay in the application reservoir 54 too long before being applied to the outer surface 16 of the rotatable cylinder 64 because it will begin to harden and form a crust in the application reservoir 54.

As will be appreciated by persons, skilled in the art, sensors not shown) can be used to monitor the liquid level 58 of the second non-shelf-stable solution 14 in the application reservoir 54, and to control the valve 52, whether directly, or indirectly, to maintain the desired liquid level 58 of the second non-shelf-stable solution 14 in the application reservoir 54. Preferably, the sensor may be a non-contact sensor, such as an ultrasonic sensor, and example of which is the RPS-401A Analog Ultrasonic Sensor manufactured by Migatron Corporation, Woodstock, Ill., U.S.A.

Preferably, the application reservoir 54 may be positioned against a rising portion 60 of the outer surface 16 of a cylinder 64 that is rotatable about a horizontal axis 66 in a clockwise direction of rotation 68. In other words, the outer surface 16 of the rotatable cylinder 64 may be moved relative to the application reservoir 54, which remains stationary. Thus, the rising portion 60 of the rotatable cylinder 64 is defined on the same side as the application reservoir 54 and a descending portion 70 of the rotatable cylinder 64 is defined on the other side 72. Preferably, the outer surface 16 of the rotatable cylinder 64 may be heated to a temperature of about 75° C. to about 85° C. so that its outer surface 16 conductively heats the second non-shelf-stable solution 14 thereon, to dry the second non-shelf-stable solution 14, as discussed below. By way of example, the rotatable cylinder 64 may be heated by oil, steam, infra-red, direct contact electric heating pads, etc, as will be appreciated by persons skilled in the art. However, other means for heating the second non-shelf-stable solution 14 on the outer surface 16 of the rotatable cylinder 64 will become apparent to the person skilled in the art. For example, heat may be applied to the second non-shelf-stable solution 14 on the outer surface 16 by radiantly heating the second non-shelf-stable solution 14 on the outer surface 16. As another example, air adjacent to the second non-shelf-stable solution 14 on the outer surface 16 may be heated to convectively heat the second non-shelf-stable solution 14 on the outer surface 16, with or without using a heated chamber. All such methods for heating the second non-shelf-stable solution 14, including combinations of such methods, as well as others available to the person skilled in the art are comprehended by the present invention.

In this way, as the heated cylinder 64 rotates, the rising portion 60 of its outer surface 16 moves past the application reservoir 54, and is contacted and coated with the second non-shelf-stable solution 14. The liquid level 58 of the second non-shelf-stable solution 14 in the application reservoir 54 is preferably maintained to ensure an even film is drawn up onto the rising portion 60 of the outer surface 16 of the rotatable cylinder 64. Preferably, the heated rotatable cylinder 64 may be sized and shaped to allow excess second non-shelf-stable solution 14 to drain off the rising portion 60 of the outer surface 16 in a direction opposite to the direction of rotation 68. As will be appreciated by persons skilled in the art, the size of the rotatable cylinder 64 may preferably be determined based on the desired throughput of the laundry detergent sheet 10.

As will be appreciated by persons skilled in the art, the position of the application reservoir 54 relative to the rotatable cylinder 64 can be varied to suit a particular application. However, good results have been achieved by positioning the application reservoir 54 on the rotatable cylinder 64, just above a horizontal plane 67 defined by the horizontal axis 66 of the rotatable cylinder 64. All such variations in the positioning of the application reservoir 54 are comprehended by the present invention.

The preferred application reservoir 54 may have a length corresponding to the length of the rotatable cylinder 64, for example about one meter, and an overall size and shape to hold a liquid volume of the second non-shelf-stable solution 14 sufficient to continuously coat the outer surface of the heated rotatable cylinder 64 for a predetermined application duration, at a predetermined cylinder rotation speed. By way of example, good results have been obtained with a predetermined application time of about fifteen minutes, utilizing a 1.5 meter diameter by 1.2 meter long heated rotatable cylinder 64 rotating at a rotation speed of about 4 rotations per hour (rph). However, it will be appreciated by persons skilled in the art that the above parameters such as the size, shape and rotation speed of the rotatable cylinder 64, the size and shape of the application reservoir 54, and the associated predetermined application duration, may all be varied to obtain the desired results without undue experimentation. All such parameters are therefore comprehended by the present invention.

Although FIG. 3 only shows one conduit 50 and one valve 52, it will be appreciated that more conduits 50 and/or valves 52 may be provided, for example, three equidistant valves 52 may be used to ensure that a viscous non-shelf-stable solution 14 flows quickly enough from the supply reservoir 48 to fill the one meter long application reservoir 54 to the desired liquid level 58 and to maintain the desired liquid level as the second non-shelf-stable solution 14 is drawn on to the moving outer surface 16 of the heated rotatable cylinder 64, when in use.

Figure 4:
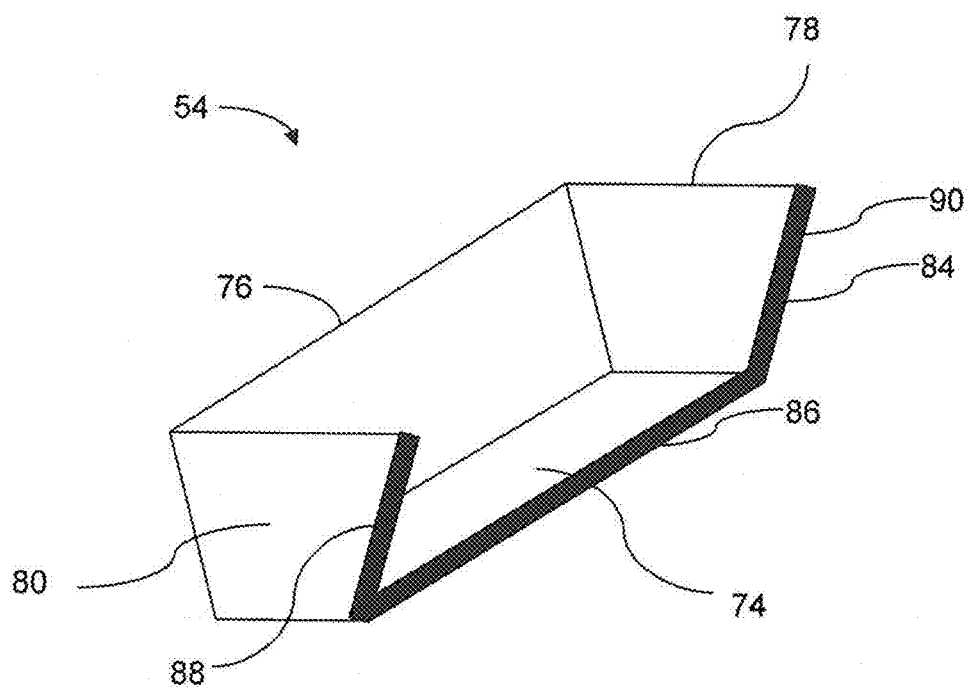
FIG. 4 is a diagram showing of an application reservoir trough of the apparatus of FIG. 3.

Referring now to FIG. 4, the preferred application reservoir 54 may be a trough formed with a bottom wall 74, a front wall 76, two side walls 78, 80, but no back wall. It will now be appreciated that the rising portion 60 of the outer surface 16 of the heated rotatable cylinder 64 forms the back wall 82 of the application reservoir trough 54. The bottom wall 74, and two side walls 78, 80 define edges 84, 86, and 88 which are sized and shaped to fit sealingly against the outer surface 16 of the heated rotatable cylinder 64. Preferably, a non-metal, low-friction gasket 90, for example made from Teflon®, may also be disposed between the edges 84, 86, 88 and the outer surface 16 of the heated rotatable cylinder 64 in order to help prevent leaking of the second non-shelf-stable solution 14 from the application reservoir trough 54, without overly inhibiting the rotation of the heated rotatable cylinder 64.

Thus, the application reservoir trough 54 applies the second non-shelf-stable solution 14 to the outer surface 16 of the heated rotatable cylinder 64 as it slowly rotates against the application reservoir trough 54. The second-non-shelf-stable solution 14 wets the outer surface 16 of the heated rotatable cylinder 64 and sticks to it, thereby continuously coating substantially the entire length of the heated rotatable cylinder 64 with an even film. Excess non-shelf-stable solution 14 is allowed to drain off the rising portion 60 of the outer surface 16 in a direction opposite to the direction of rotation 68 of the rotatable cylinder 64 back into the application reservoir trough 54 under the influence of gravity.

The thickness of the wet film of second non-shelf-stable solution 14 applied on the outer surface 16 of the heated rotatable cylinder 64 will vary as a function of several factors, such as: the viscosity of the second non-shelf-stable solution 14, the slope of the rising portion 60 of the outer surface 16, the speed of the movement of the outer surface 16 against the application reservoir 54 (which may be governed, for example, by the speed of rotation of the rotatable cylinder 64), the temperature of the heated rotatable cylinder 64, the position of the application reservoir 54 relative to the rising portion 60, and the liquid level 58 of the liquid volume of the second non-shelf-stable solution 14 contained in the application reservoir 54, among others, as will be appreciated by persons skilled in the art.

Generally, the thicker the wet film of second non-shelf-stable solution 14 that is applied to the outer surface 16 of the heated rotatable cylinder 64, the thicker the resulting laundry detergent sheet 10 will be. Conversely, the thinner the wet film of second non-shelf-stable solution 14 that is applied to the outer surface 16 of the heated rotatable cylinder 64, the thinner the resulting laundry detergent sheet 10 will be.

Preferably the thickness of the wet film of second non-shelf-stable solution 14 that is applied to the outer surface 16 of the heated rotatable cylinder 64, results in a laundry detergent sheet 10 having a thickness in the range of about 0.6 mm to about 1.0 mm, most preferably 0.8 mm. The thickness of the wet film of second non-shelf-stable solution 14 applied to the rotatable cylinder 64 may be adjusted by varying one or more of the factors mentioned above. For example, the viscosity of the second non-shelf-stable solution 14 may be adjusted by varying the amount of starch used to prepare the second non-shelf-stable solution 14, since more starch results in a more viscous second non-shelf-stable solution 14 which tends to produce a thicker laundry detergent sheet 10, and less starch results in a less viscous non-shelf-stable solution 14, which tends to produce a thinner laundry detergent sheet 10. It is contemplated that a non-contact thickness measuring device may be installed to measure the wet film of second non-shelf-stable solution 14 applied to the rotatable cylinder 64 and/or the dried laundry detergent sheet 10.

The wet film of second non-shelf-stable solution 14 is slowly dried on the outer surface 16 of the heated rotatable cylinder 64 by the heat from the heated rotatable cylinder 64. Prior to one complete revolution of the heated rotatable cylinder 64, the wet film of second non-shelf-stable solution 14 has been dried enough to form a solid laundry detergent sheet 10 having sufficient structural integrity to permit its removal from the heated rotatable cylinder 64. In this regard, good results have been obtained by drying the wet film of second non-shelf-stable solution 14 on the outer surface 16 of the heated rotatable cylinder 64 to remove about 95% of the water, leaving a residual moisture level of about 5% in the resulting laundry detergent sheet 10. Preferably, the laundry detergent sheet may have a moisture content of about 3% to about 10%.

Preferably, the laundry detergent sheet 10 may be removed from the heated rotatable cylinder 64 with a scraper member or blade 94. Preferably, the scraper member 94 may be positioned on the other side 72 of the rotatable cylinder 64, just above the horizontal plane 67, which is about 180 degrees from the position of the application reservoir trough 54. However, it will be appreciated by persons skilled in the art that the position of the scraper member 94 relative to the rotatable cylinder 64 can be varied to suit a particular application. For example, to maximize the use of the heated outer surface 16 of the rotatable cylinder 64 and thereby increasing the overall speed with which the laundry detergent sheet is made by the laundry detergent sheet making apparatus 46, it may be desirable to position the scraper member 94 as much as 330 degrees from the application reservoir trough 54. All such variations in the positioning of the scraper member 94 are comprehended by the present invention. In other words, the point where the laundry detergent sheet 10 is removed from the outer surface 16 of the rotatable cylinder 64 may, depending on various factors, be any point downstream of the application reservoir trough 54, prior to about one revolution of the rotatable cylinder 64, which would bring the laundry detergent sheet removal point adjacent to the application reservoir trough 54.

Figure 5:
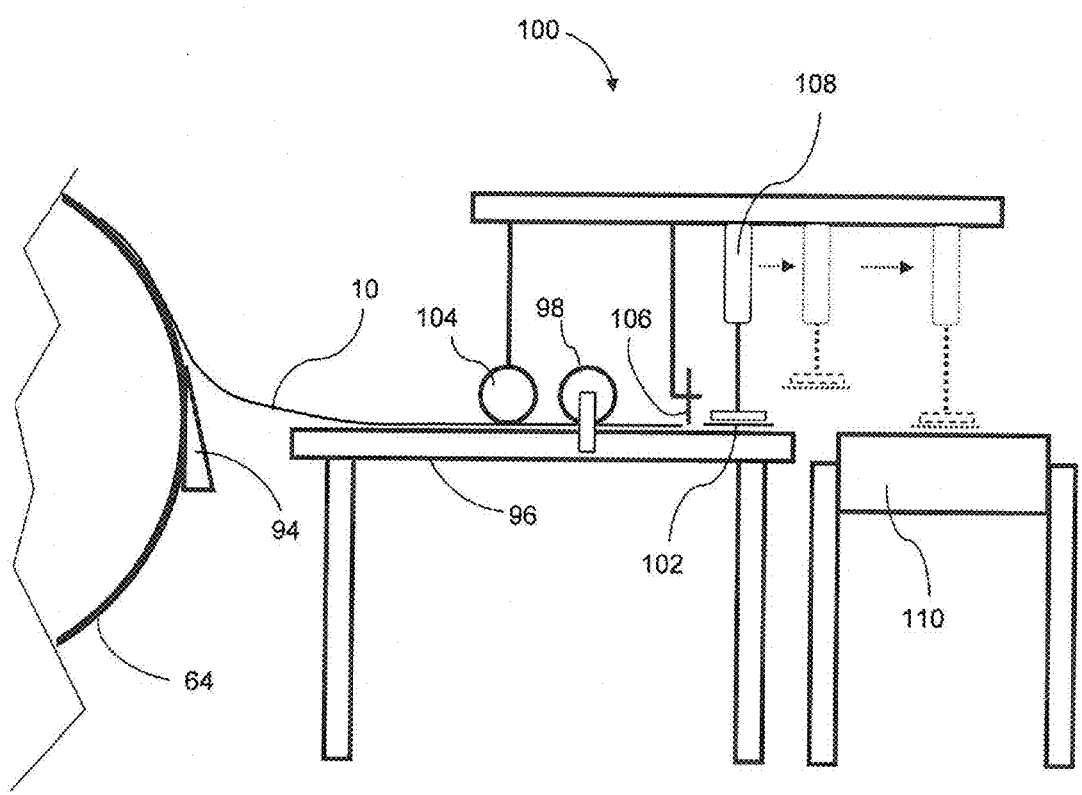
FIG. 5 is a diagram showing a cutting machine downstream of the apparatus of FIG. 3, for processing the laundry detergent sheet into smaller laundry detergent sheets, according to an embodiment of the present invention.

As shown in FIG. 5, the laundry detergent sheet 10 may be fed from the laundry detergent sheet making apparatus 46 along a table 96 by a drive roller 98 through a cutting machine 100 for processing into smaller laundry detergent sheets 102, for example with the use of mechanical cutters (i.e. longitudinal cutters 104 and transverse cutters 106), laser beams, etc., as will be appreciated by persons skilled in the art. Preferably, the smaller laundry detergent sheets 102 may be sized and shaped for supplying a dose appropriate for one small, medium, large, or extra-large sized load of laundry. By way of example, the smaller laundry detergent sheets 102 may be cut to a width in the range of about 5 cm to about 10 cm, and a length in the range of about 10 cm to about 15 cm.

As also shown in FIG. 5, one or more actuators 108 and/or conveyors 110 may be used to transport the smaller laundry detergent sheets 102 to another station for additional processing such as for example, sorting and/or packaging.

Preferably, the smaller laundry detergent sheets 102 made according to embodiments of the present invention will possess one or more of the following properties:

a) percentage moisture content: about 3% to about 10%;

b) weight: about 2 g to about 8 g (depending on the thickness, width, and length of the smaller laundry detergent sheet 102);

c) thickness: about 0.6 to about 1.0 mm;

d) width: about 5 to about 10 cm;

e) length: about 10 to about 15 cm;

f) flexibility: sufficient to permit tightly rolling the smaller laundry detergent sheet 102 onto a 2 cm diameter dowel without the smaller laundry detergent sheet 102 developing any cracks;

g) tackiness: the smaller laundry detergent sheet 102 is substantially free of tackiness to the touch;

h) dissolvability: when placed into 2 liters of cold (11-12° C.) water, at least 80% of the smaller laundry detergent sheet 102 wets in about 30 seconds, and the smaller laundry detergent sheet 102 dissolves completely in about 2 minutes; and i) tearability: the smaller laundry detergent sheet 102 is tearable by hand (for example in halt) without undue strain (additionally the sheet 102 may include a line of weakness, such as a perforated seam to facilitate tearing the smaller laundry detergent sheet 102 at one or more locations).

Figure 6:
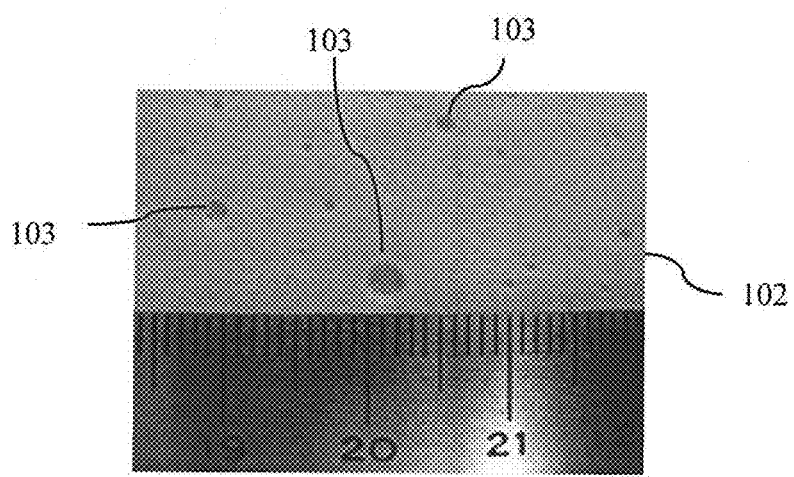
FIG. 6 is a top view of a top side of a portion of the smaller laundry detergent sheet of FIG. 5 next to a ruler.

Furthermore, the bottom side of the smaller laundry detergent sheet 102 (i.e. the side that was in contact with surface 16) may be smooth and almost glossy (but not glazed, which would indicate over-drying). As shown in FIG. 6, the top side of the smaller laundry detergent sheet 102 (i.e. the other side, which was not in contact with surface 16) is rougher to the touch and may exhibit small craters 103 similar in appearance to the surface of a natural sponge. It is believed that the craters 103 help with dissolving the smaller laundry detergent sheets 102 in water since more surface area is exposed to the water. Preferably, the size of the craters may be lehss than or equal to 4 mm, mostly for aesthetic reasons, although over-sized craters may indicate that the second non-shelf-stable solution 14 used to make the sheet 102 is either under too much pressure in the supply reservoir 48 (i.e. the lid 56 is too heavy) or nearing the end of its useful life. However, the smaller laundry detergent sheet 102 will preferably be free of pinholes, or any other unintended perforations.

As mentioned above, the preferred smaller laundry detergent sheets 102 may be sized and shaped for supplying a dose appropriate for one small, medium, large, or extra-large sized load of laundry. As will be appreciated, the preferred quantity of cleaning active or detergent present in the smaller laundry detergent sheet 102 depends on the concentration of the liquid detergent mixture in the second non-shelf-stable solution 14 in combination with the dimensions of the smaller laundry detergent sheet 102. In general, the smaller the dimensions of the smaller laundry detergent sheet 102, the more concentrated the liquid detergent mixture needs to be in order to provide an effective dose. For example, in a preferred smaller laundry detergent sheet 102 measuring 10 cm×13 cm, the liquid detergent mixture accounts for 11.8 wt-% of the second non-shelf-stable solution 14. Accordingly, in this example, the preferred liquid detergent mixture for one standard laundry load is about 10× concentrated.

Having described an embodiment of the present invention which utilizes a heated cylinder which is rotatable about a horizontal axis to form and dry the laundry detergent sheet, it will now be appreciated that the outer surface 16 of the rotatable cylinder represents one example of a movable surface to which the second non-shelf-stable solution 14 may be applied. Although the preferred movable surface includes a rising portion to facilitate the formation of a uniform wet film of second non-shelf stable solution 14 during the application step, partly due to the action of excess second non-shelf-stable solution 14 draining in the opposite direction under the influence of gravity, it will be appreciated that other embodiments of the invention may omit a rising portion in favour of a substantially horizontal movable surface. For example, a leveling blade (not shown) may be used to ensure a consistent thickness of non-shelf-stable solution 14 being applied to the outer surface 16 of the rotatable drum 64.

Figure 7:
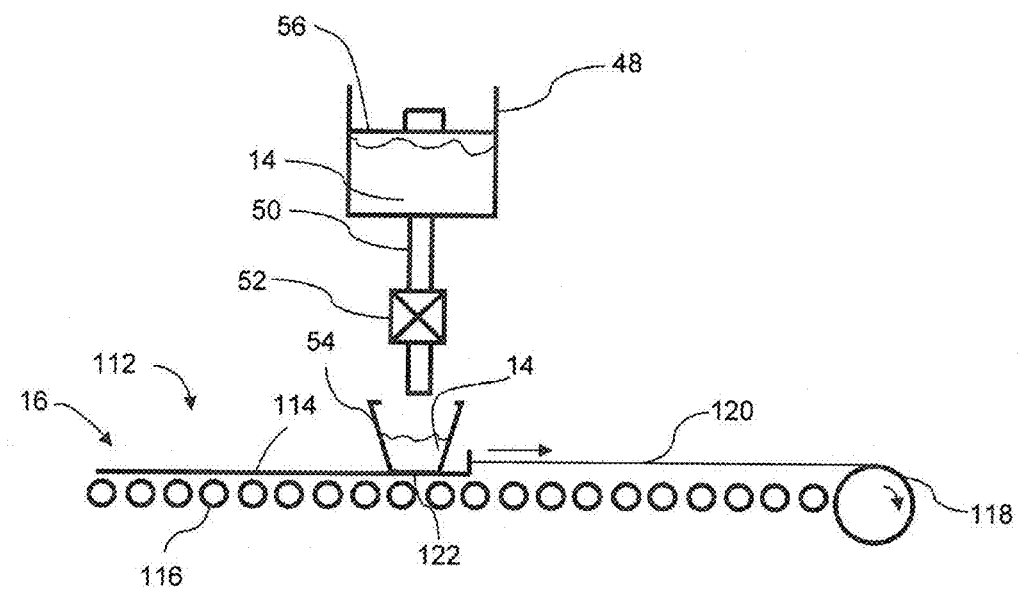
FIG. 7 is a diagram showing a conveyor with no rising portion, according to another embodiment of the present invention.

By way of example, FIG. 7 shows a conveyor 112 having no rising portion. In this example the second non-shelf-stable solution 14 is applied to a substantially horizontal movable surface in the form of a plate 114 resting on a series of rollers 116. The plate 114 is configured to be moved along the rollers 116 by a motorized pulley 118 connected thereto via cable 120. The application reservoir 54, in this case, may be a trough with an open bottom 122 for applying the second non-shelf-stable solution 14 to the plate 114 as it passes underneath.

Figure 8:
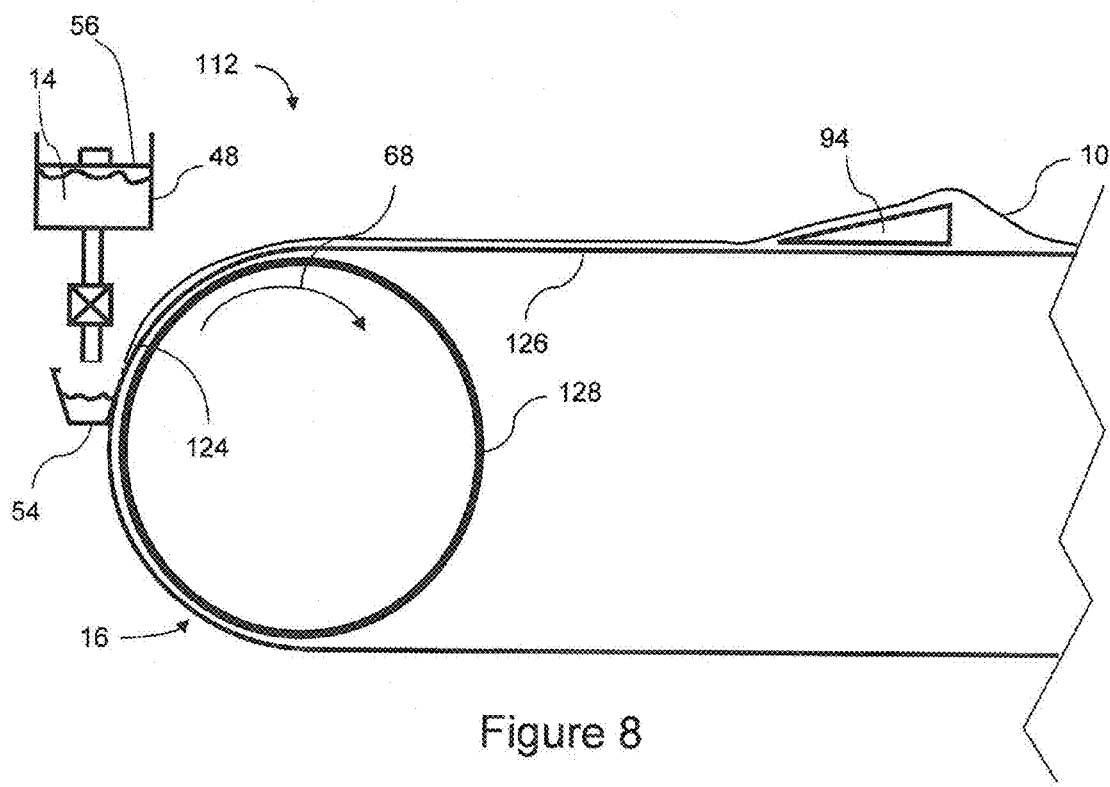
FIG. 8 is a diagram showing a conveyor with a curved rising portion, according to another embodiment of the present invention.

As another example, FIG. 8 shows a conveyor 112 having a curved rising portion 124, such as a partial cylinder. In this example, the second non-shelf-stable solution 14 is applied to the curved, partial Cylinder shaped rising portion defined by a movable surface in the form of a conveyor web 126 supported on a conveyor roller 128.

Figure 9:
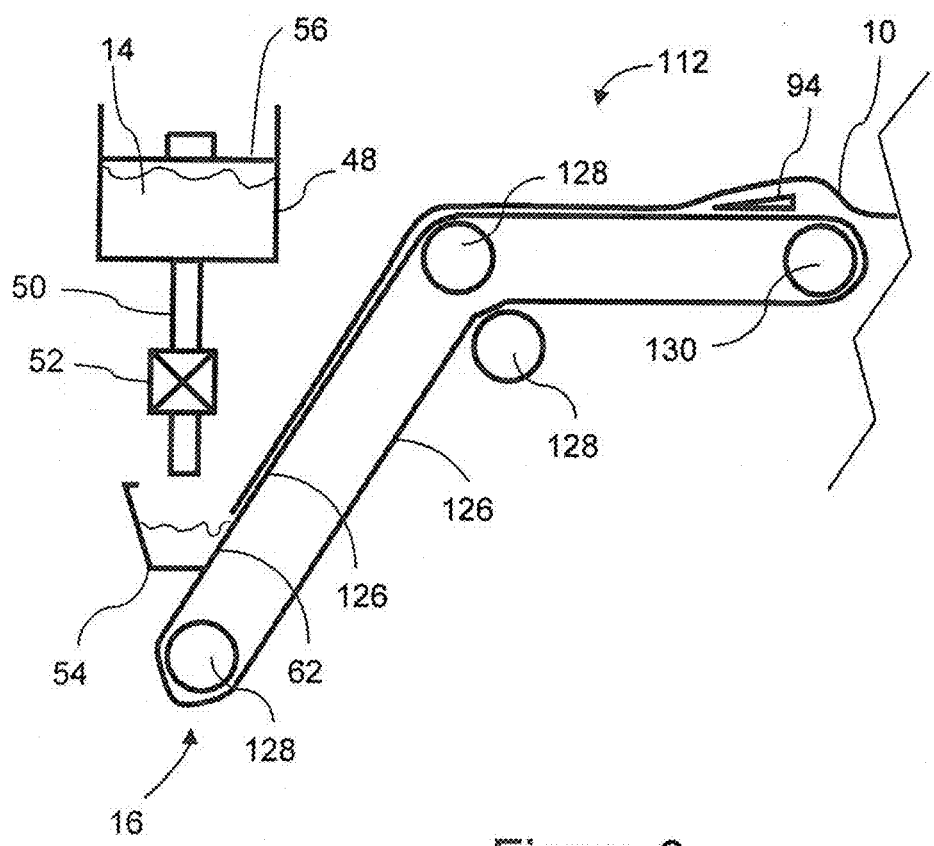
FIG. 9 is a diagram showing a conveyor with a non-curved rising portion, according to another embodiment of the present invention.

As yet another example, FIG. 9 shows a conveyor 112 having a non-curved rising portion 62, such as an inclined plane. In this example, the second non-shelf-stable solution 14 is applied to the non-curved, inclined plane shaped rising portion defined by a movable surface in the form of a conveyor web 126 supported on conveyor rollers 128 and a motorized pulley 130.

Preferably the conveyor 112 may be heated to a temperature of about 75° C. to about 85° C. so that its outer surface 16 conductively heats the second non-shelf-stable solution 14 thereon, to dry the second non-shelf-stable solution 14. Means for heating the second non-shelf-stable solution 14 on the outer surface 16 of the conveyor 112 will become apparent to the person skilled in the art. For example, heat may be applied to the second non-shelf-stable solution 14 on the outer surface 16 by radiantly heating the second non-shelf-stable solution 14 on the outer surface 16. As another example, air adjacent to the second non-shelf-stable solution 14 on the outer surface 16 may be heated to convectively heat the second non-shelf-stable solution 14 on the outer surface 16, with or without using a heated chamber. All such methods for heating the second non-shelf-stable solution 14, as well as others available to the person skilled in the art are comprehended by the present invention.

Figure 10:
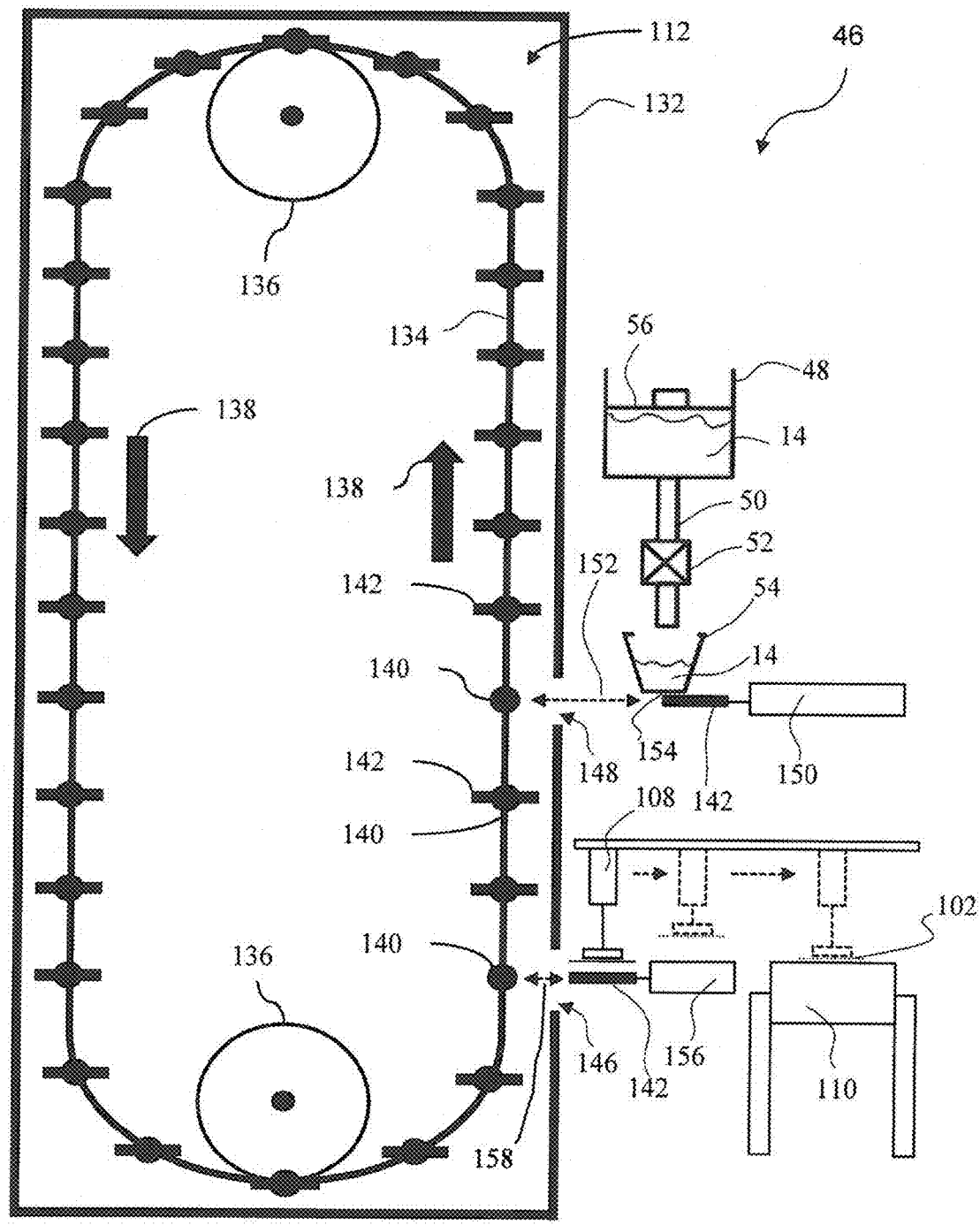
FIG. 10 is a diagram showing an apparatus for making the second non-shelf-stable solution into a laundry detergent sheet according to another embodiment of the present invention.
Figure 11:
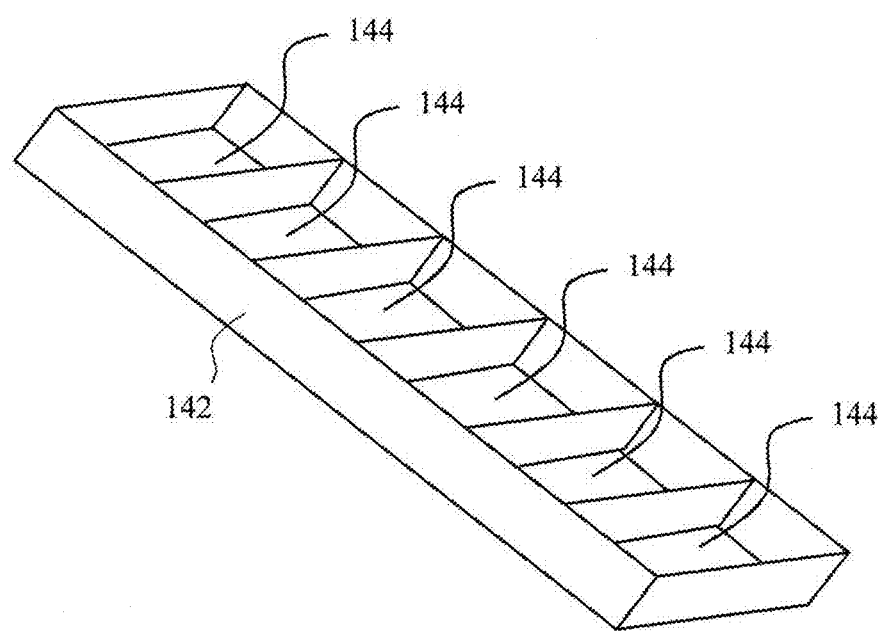
FIG. 11 is a diagram showing a tray form of the apparatus of FIG. 10.

As yet another example, FIG. 10 shows a conveyor 112 housed inside of a heated chamber, such as an oven 132. Preferably the conveyor 112 includes a webbing 134 supported by rollers 136, and movable in a counter-clockwise direction as indicated by arrows 138. As can be seen, the webbing 134 carries equally spaced holders 140, each of which is capable of holding a surface, such as tray form 142, which is shown in FIG. 11 as having six identical compartments 144. The compartments 144 are sized and shaped to form moulds for holding the second non-shelf-stable solution 14. Therefore, as the conveyor 112 moves the tray forms 142 through the oven 132, the heat of the oven 132 dries the second non-shelf-stable solution 14 in the compartments to form the smaller laundry detergent sheets 102. The tray forms 142 may have more or fewer compartments, depending on the size of the oven 132 and the desired throughput.

Preferably, the conveyor 112 may be configured so that the holders 140 will maintain the tops of the tray forms 142 oriented upwards as they move on the conveyor 112. This is so that the second non-shelf-stable solution 14 or smaller laundry detergent sheets 102 on the tray forms 142 will not spill or fall off of the tray forms 142 as they move on the conveyor 112.

Preferably, the conveyor 112 may be configured to stop intermittently to allow one tray form 142 to be removed and emptied at one location, such as opening 146, while another tray form 142 is being removed and filled with the second non-shelf-stable solution 14 at a downstream location of the conveyor 112, such as opening 148.

Preferably, a programmable piston 150 may be configured to reach into the oven 132 through opening 148, while the conveyor 112 is stopped, and retrieve an empty tray form 142 from the holder 140, as indicated by arrow 152. The programmable piston 150 may then pass the tray form 142 under a gated bottom 154 of the application reservoir 54. As the tray form 142 passes under the application reservoir 54, the gated bottom 152 will temporarily open to fill the compartments 144 of the tray form 142 with the second non-shelf-stable solution 14. Then the piston 150 may insert the tray form 142 back into the holder 140 through opening 148 in oven 132.

At about the same time, while the conveyor 112 is stopped, a second programmable piston 156 reaches into the oven 132 through opening 146 and retrieves a tray form 142 from holder 140, as indicated by arrow 158. The retrieved tray form 142 has been carried by conveyor 112 through the oven from opening 148 to opening 146, and so contains dried smaller laundry detergent sheets 102 in each of the six compartments 144. Preferably, one or more actuators 108 and/or conveyors 110 may be used to transport the smaller laundry detergent sheets 102 from the compartments 144 to another station for additional processing such as, for example, sorting and/or packaging. The piston 156 then inserts the emptied tray form 142 back into the holder 140 through opening 146 in oven 132.

While using programmable pistons 150 and 156 are preferred, it will be understood that they are only one of several methods for moving the tray forms 142 to and from the conveyor 112, that are available to a person skilled in the art. All such methods for moving the tray forms 142 to and from the conveyor 112 are comprehended by the present invention.

Additionally, it is contemplated that the non-shelf-stable solution 14 may be applied to a surface that is not movable, prior to a drying step. For example, the surface may remain stationary as the second non-shelf-stable solution 14 is applied thereto an applicator. In this regard, the non-shelf-stable solution 14 may be applied to a surface by an applicator other than the application reservoir 54 described above. For example, the applicator may be configured for extruding, spraying, or painting the second non-shelf-stable solution 14 onto the surface. All such methods of applying the second non-shelf-stable solution 14 to the surface, whether movable or not relative to the applicator, are comprehended by the present invention.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

The embodiments of the invention in which an exclusive property or privilege is claimed are defined as follows:

1. A method of making a laundry detergent sheet, said method comprising the steps of:
   preparing a first shelf-stable solution;
   preparing a second non-shelf-stable solution comprising a portion of said first shelf-stable solution;
   applying said second non-shelf-stable solution onto a heated surface; and drying said second non-shelf-stable solution on said surface to form said laundry detergent sheet,
   wherein said applying step comprises moving at least a portion of said surface in a rising direction, and contacting said rising portion of said surface with said second non-shelf-stable solution to coat said surface with said second non-shelf-stable solution and allow excess second non-shelf-stable solution to drain off said rising portion of said surface in a direction opposite the rising direction.

2. The method of making a laundry detergent sheet as claimed in claim 1, wherein said first shelf-stable solution comprises:
   a) about 5 to about 20 wt-% of polyvinyl alcohol;
   b) about 15 to about 30 wt-% of α-olefin sulfonate;
   c) about 1 to about 15 wt-% of glycerin;
   d) about 0.01 to about 5 wt-% of preservative; and
   e) about 20 to about 80 wt-% of water.

3. The method of making a laundry detergent sheet as claimed in claim 2 wherein said first shelf-stable solution comprises:
   a) about 10.1 wt-% of polyvinyl alcohol;
   b) about 21.8 wt-% of α-olefin sulfonate;
   c) about 10.66 wt-% of glycerin;
   d) about 0.14 wt-% of preservative; and
   e) about 57.3 wt-% of water.

4. The method of making a laundry detergent sheet as claimed in claim 3, wherein said preservative comprises methylisothiazolinone (MIT) and chlorotnethylisothiazolinone (CIT).

5. The method of making a laundry detergent sheet as claimed in claim 3, wherein said α-olefin sulfonate has a concentration of about 36 wt-% to about 42 wt % in water.

6. The method of making a laundry detergent sheet as claimed in claim 5, wherein said α-olefin sulfonate has a concentration of about 38 wt-% in water.

7. The method of making a laundry detergent sheet as claimed in claim 1, wherein said first shelf-stable solution has a viscosity in the range of about 45,000 centipoise to about 85,000 centipoise at a temperature of about 14° C. to about 18° C.

8. The method of making a laundry detergent sheet as claimed in claim 1, wherein said first shelf-stable solution has a viscosity in the range of about 22,000 centipoise to about 67,000 centipoise at a temperature of about 20° C. to about 24° C.

9. The method of making a laundry detergent sheet as claimed in claim 1, wherein said first shelf-stable solution has a viscosity in the range of about 12,000 centipoise to about 40,000 centipoise at a temperature of about 28° C. to about 32° C.

10. The method of making a laundry detergent sheet as claimed in claim 1, wherein said first shelf-stable solution has a density of about 1.01 g/ml to about 1.20 g/ml at a temperature of about 20° C. to about 24° C.

11. The method of making a laundry detergent sheet as claimed in claim 1, wherein said first shelf-stable solution has a useful time of up to at least two months at room temperature.

12. The method of making a laundry detergent sheet as claimed in claim 1, wherein said second non-shelf-stable solution comprises:
   a) about 20 wt-% to about 80 wt-% of said first shelf-stable solution;
   b) about 10 wt-% to about 50 wt-% of starch;
   c) about 0.10 wt-% to about 5 wt-% of liquid paraffin;
   d) about 0.10 wt-% to about 5 wt-% of glycerin; and
   e) about 1 wt-% to about 25 wt-% of liquid detergent, wherein said liquid detergent comprises as aqueous solution of one or more of:
   sodium laureth sulfate;
   sodium borate;
   sodium metasilicate;
   hexylene glycol;
   citric acid;
   lauryl glucoside; and
   laureth-4.

13. The method of making a laundry detergent sheet as claimed in claim 12, wherein said second non-shelf-stable solution comprises:
   a) about 67.0 wt-% of said first shelf-stable solution;
   b) about 19.7 wt-% of starch;
   c) about 0.5 wt-% of liquid paraffin.
   d) about 1.0 wt-% of glycerin; and
   e) about 11.8 wt-% of said liquid detergent.

14. The method of making a laundry detergent sheet as claimed in claim 13, wherein said liquid detergent comprises:
   a) about 5 wt-% to about 90 wt-% of sodium laureth sulfate;
   b) about 0.1 - wt-% to about 5 wt-% of sodium borate;
   c) about 0.1 wt-% to about 10 wt-% of sodium metasilicate;
   d) about 0.1 wt-% to about 10 wt-% of hexylene glycol;
   e) about 0.1 wt-% to about 10 wt-% of cocamidopropyl betaine;
   f) about 0.1 wt-% to about 10 wt-% of citric acid;
   g) about 0.1 wt-% to about 10 wt-% of lauryl glucoside;
   h) about 0.1 wt-% to about 20 wt-% of laureth-4; and
   i) about 5 wt-% to about 50 wt-% of water.

15. The method of making a laundry detergent sheet as claimed in claim 1, wherein said second non-shelf-stable solution has a useful time of up to at least 6 hours at room temperature.

16. The method of making a laundry detergent sheet as claimed in claim 1, wherein said movable surface is a conveyor.

17. The method of making a laundry detergent sheet as claimed in claim 16, wherein said conveyor has a curved rising portion.

18. The method of making a laundry detergent sheet as claimed in claim 17, wherein said curved rising portion of said conveyor is a partial cylinder.

19. The method of making a laundry detergent sheet as claimed in claim 16, wherein said conveyor has a non-curved rising portion.

20. The method of making a laundry detergent sheet as claimed in claim 1, wherein said movable surface is a cylinder rotatable about a horizontal axis with said rising portion on one side and a descending portion on the other side.

21. The method of making a laundry detergent sheet as claimed in claim 1, wherein said contacting said rising portion of said surface with said second non-shelf-stable solution comprises positioning an application reservoir, for holding a liquid volume of said second non-shelf-stable solution, against said rising portion of said surface.

22. The method of making a laundry detergent sheet as claimed in claim 21, further comprising maintaining a liquid level of said second non-shelf-stable solution in said application reservoir by gravity feed from a supply reservoir.

23. The method of making a laundry detergent sheet as claimed in claim 21, wherein said applying step further comprises adjusting a thickness: of said second non-shelf-stable solution on said surface by varying a viscosity of said second non-shelf-stable solution, varying a slope of the rising portion of said surface, varying a speed of the movable surface, varying a heat of said drying step, varying a position of said application reservoir relative to said rising portion, and/or varying a liquid level of said second non-shelf-stable solution in said application reservoir.

24. The method of making a laundry detergent sheet as claimed in claim 1, wherein said heated surface conductively heats said second non-shelf-stable solution on said surface.

25. The method of making a laundry detergent sheet as claimed in claim 24, wherein said heated surface is a conveyor.

26. The method of making a laundry detergent sheet as claimed in claim 24, wherein said heated surface is a cylinder rotatable about a horizontal axis.

27. The method of making a laundry detergent sheet as claimed in claim 1, wherein said drying step further comprises applying heat to said second non-shelf-stable solution on said surface.

28. The method of making a laundry detergent sheet as claimed in claim 27, wherein said step of applying heat to said second non-shelf-stable solution on said surface comprises radiantly heating said second non-shelf-stable solution on said surface.

29. The method of making a laundry detergent sheet as claimed in claim 27, wherein said step of applying heat to said second non-shelf-stable solution on said surface comprises heating air adjacent to said second non-shelf-stable solution on said surface to convectively heat said second non-shelf-stable solution on said surface.

30. The method of making a laundry detergent sheet as claimed in claim 29, wherein said step of heating air adjacent to said second non-shelf-stable solution on said surface is carried out in a heated chamber.

31. The method of making a laundry detergent sheet as claimed in claim 30, further comprising the step of moving said second non-shelf-stable solution on said surface through said heated chamber.

32. The method of making a laundry detergent sheet as claimed in claim 27, wherein said heat applied to said second non-shelf-stable solution on said surface is about 75° C. to about 85° C.

33. The method of making a laundry detergent sheet as claimed in claim 1, wherein said drying step is configured to remove about 95% of the water present in the second non-shelf-stable solution.

34. The method of making a laundry detergent sheet as claimed in claim 1, wherein said laundry detergent sheet has a moisture content of about 3% to about 10% by weight.

35. The method of making a laundry detergent sheet as claimed in claim 34, wherein said laundry detergent sheet has a thickness of about 0.6 mm to about 1.0 mm.

36. The method of making a laundry detergent sheet as claimed in claim 1, further comprising removing said laundry detergent sheet from said surface.

37. The method of making a laundry detergent sheet as claimed in claim 36, wherein said removing said laundry detergent sheet from said surface comprises positioning a scraper member downstream of said drying step.

38. The method of making a laundry detergent sheet as claimed in claim 1, further comprising cutting the laundry detergent sheet into smaller sheets.

39. The method of making a laundry detergent sheet as claimed in claim 38, wherein said cutting is by mechanical cutters, laser cutters, or water jet cutters.

40. The method of making a laundry detergent sheet as claimed in claim 38, wherein at least one of said smaller sheets is sized and shaped for use with one small, medium, large, or extra-large sized load of laundry.

41. The method of making a laundry detergent sheet as claimed in claim 38, wherein at least one of said smaller sheets has a width of about 5 cm to about 10 cm.

42. The method of making a laundry detergent sheet as claimed in claim 38, wherein at least one of said smaller sheets has a length of about 10 cm to about 15 cm.

43. A method of making a laundry detergent sheet, said method comprising the steps of:
preparing a first shelf-stable solution;
preparing a second non-shelf-stable solution comprising a portion of said first shelf-stable solution;
contacting a rising portion of a surface on one side of a heated cylinder, rotating in one direction about a horizontal axis, with said second non-shelf-stable solution to coat said surface with said second non-shelf-stable solution and allow excess second non-shelf-stable solution to drain off said rising portion of said surface in a direction opposite the one direction;
drying said second non-shelf-stable solution on said surface of said heated cylinder to form said laundry detergent sheet; and
removing said laundry detergent sheet from said surface of said heated cylinder.

44. The method of making a laundry detergent sheet as claimed in claim 43, wherein said laundry detergent sheet is capable of dissolving in a laundry cycle of an automatic washing machine.

45. The method of making a laundry detergent sheet as claimed in claim 43, wherein said removing said laundry detergent sheet from said surface comprises positioning a scraper member downstream of said drying step.

46. The method of making a laundry detergent sheet as claimed in claim 45, further comprising rutting the laundry detergent sheet into smaller sheets.

47. The method of making a laundry detergent sheet as claimed in claim 46, wherein at least one of said smaller sheets is sized and shaped for use with one small, medium, large, or extra-large sized load of laundry.

48. The method of making a laundry detergent sheet as claimed in claim 43, wherein said contacting said rising portion of said surface with said second non-shelf-stable solution comprises positioning an application reservoir, for holding a liquid volume of said second non-shelf-stable solution, against said rising portion of said surface.

49. The method of making a laundry detergent sheet as claimed in claim 48, further comprising maintaining a liquid level of said second non-shelf-stable solution in said application reservoir by gravity feed from a supply reservoir.

50. The method of making a laundry detergent sheet as claimed in claim 48, wherein said applying step comprises adjusting a thickness of said second non-shelf-stable solution on said surface by varying a viscosity of said second non-shelf-stable solution, varying a slope of the rising portion of said surface, varying a speed of the rotating cylinder, varying a heat of said drying step, varying a position of said application reservoir relative to said rising portion, and/or varying a liquid level of said second non-shelf-stable solution in said application reservoir.

\* \* \* \* \*